(12) United States Patent
Carroll et al.

(10) Patent No.: US 7,739,747 B2
(45) Date of Patent: *Jun. 15, 2010

(54) DYNAMIC CONTROL OF AUTHORIZATION TO ACCESS INTERNET SERVICES

(75) Inventors: Patrick Colum Carroll, Atlanta, GA (US); Judd Adam Schorr, Marietta, GA (US); Matthew Bunkley Trevathan, Kennesaw, GA (US); Angela Jo Yochem, Marietta, GA (US); Daniel Joseph Yochem, Marietta, GA (US)

(73) Assignee: International Business Machines Corporation, Armonk, NY (US)

( * ) Notice: Subject to any disclaimer, the term of this patent is extended or adjusted under 35 U.S.C. 154(b) by 96 days.

This patent is subject to a terminal disclaimer.

(21) Appl. No.: 12/058,811

(22) Filed: Mar. 31, 2008

(65) Prior Publication Data

US 2008/0184342 A1 Jul. 31, 2008

Related U.S. Application Data

(63) Continuation of application No. 09/947,103, filed on Sep. 5, 2001, now Pat. No. 7,370,365.

(51) Int. Cl.
*H04L 9/32* (2006.01)
*H04L 12/22* (2006.01)
*G06F 15/16* (2006.01)
*G06F 17/30* (2006.01)
*H04N 7/173* (2006.01)

(52) U.S. Cl. .............................. 726/28; 726/1; 709/229
(58) Field of Classification Search ..................... 726/28
See application file for complete search history.

(56) References Cited

U.S. PATENT DOCUMENTS

| 5,083,309 | A | 1/1992 | Beysson |
| 5,495,411 | A | 2/1996 | Ananda |
| 5,654,746 | A | 8/1997 | McMullan et al. |
| 5,870,550 | A | 2/1999 | Wesinger, Jr. et al. |
| 5,987,611 | A | 11/1999 | Freund |
| 6,014,686 | A | 1/2000 | Elnozahy et al. |
| 6,038,563 | A | 3/2000 | Bapat et al. |

(Continued)

OTHER PUBLICATIONS

Office Action (Mail Date Sep. 1, 2009) for U.S. Appl. No. 12/058,842, filed Mar. 31, 2008, Confirmation No. 3960.

*Primary Examiner*—Matthew T Henning
(74) *Attorney, Agent, or Firm*—Schmeiser, Olsen & Watts; John R. Pivnichny; David R. Irvin

(57) ABSTRACT

Programmable storage media including programmable software for managing authorization to access Internet services. A session object is created when a user logs onto a web site. The session object includes authorization-privilege information for N services. The user selects the service desired from the web site, at which point the server checks the session object. If the session object does not include authorization to access the selected service, the server consults a directory service. If the user is authorized according to the directory service, authorization-to-access information is incorporated into the session object. When authorization is conditional, a listener object is created within the session object. The listener object registers with a broadcast object and receives information germane to conditions of authorization. The listener object analyzes the information according to conditions of authorization, and terminates access to the selected service when conditions of authorization are not satisfied.

3 Claims, 3 Drawing Sheets

U.S. PATENT DOCUMENTS

| | | |
|---|---|---|
| 6,189,032 B1 | 2/2001 | Susaki et al. |
| 6,601,082 B1 | 7/2003 | Durham et al. |
| 6,795,856 B1 | 9/2004 | Bunch |
| 6,948,183 B1 | 9/2005 | Peterka |
| 7,263,523 B1 | 8/2007 | Germscheid et al. |
| 7,272,720 B2 | 9/2007 | Hasebe et al. |
| 7,472,353 B1 * | 12/2008 | Wolff et al. .................. 715/764 |
| 2002/0013909 A1 | 1/2002 | Baumeister et al. |

* cited by examiner

DYNAMIC CONTROL OF AUTHORIZATION TO ACCESS INTERNET SERVICES

This application is a continuation application claiming priority to Ser. No. 09/947,103, filed Sep. 5, 2001 now U.S. Pat. No. 7,370,365.

FIELD OF THE INVENTION

The present invention relates generally to the field of Internet services, and more particularly to a method of managing authorization to access services provided by Internet Service Providers and Application Service Providers.

BACKGROUND

Internet Service Providers (ISPs) and Application Service Providers (ASPs) offer a variety of services through the World Wide Web. As a matter of business practice, access to these services may be controlled to admit only users who meet certain qualifications or who have established themselves as paying customers. In general, controlling access has two aspects—authentication and authorization. Authentication is the process of verifying a user's identity, and is typically satisfied when the user proffers an account identifier such as a "USERID" and password. Authorization is the process of verifying that the user, once properly authenticated, has privilege to access a particular service.

It is important to note that authorization decisions are binary. The binary nature of authorization—a user is either authorized to access a particular service, or not—constrains the service provider's options. Rather than have all authorization decisions be binary decisions, a service provider might prefer instead to authorize a particular user to access a selected service under certain conditions, and yet deny the same user authorization to access the same service when conditions change. For example, a service provider might make authorization to access a particular Internet service dependent upon time of day, granting around-the-clock authorization to access the service only to users who agree to a premium billing rate, and granting other users authorization to access the service only at certain times of the day.

In principle, a condition of authorization such as time-of-day dependence might be imposed by adding a parameter to a user's directory services profile, and checking this parameter before granting authorization to access a selected service. For example, a particular user's directory services profile might show that the user has authorization to access a chat room between 7:00 PM and 8:00 PM. When such a user selected the chat room service, the current time of day would be compared with the conditions of authorization in the user's directory services profile, and authorization to access the chat room would be either granted or denied depending on the outcome of the comparison.

A significant problem arises, however, when a user's authorization to access a service needs to be revoked mid-course through a session rather than denied at the beginning of the session. For example, the user mentioned above would be authorized to access the chat room at 7:25 PM. At 8:00 PM, however, the user's access to the chat room should be revoked or terminated.

Notwithstanding, revoking access is easier said than done. When a service provider supports hundreds of thousands of users, considerations of processing efficiency become paramount—with today's technology, it is not practical to periodically poll hundreds of thousands of session objects and variables to maintain globally correct access information and access authorizations.

Thus, there is a need for a way of controlling authorization to access Internet services that empowers service providers to manage session objects efficiently and dynamically to grant, deny, and terminate-mid-course access authorizations for members of large populations of users, wherein a service provider does not incur the processing burden of periodically polling a large set of session objects and access-control variables.

SUMMARY

The present invention provides an efficient way for Application Service Providers (ASPs) and Internet Service Providers (ISPs) to manage session objects and to dynamically control authorization to access Internet services. With the invention, a service provider may authorize access, deny access, or terminate access already granted mid-course as conditions change.

According to the present invention, when a user logs onto a web site provided by an Application Service Provider or an Internet Service Provider, the server supporting the web site creates a session object for that user. The session object may include the user's conditions of authorization for the N services most recently or most frequently accessed by the user in the past. The user then selects the service desired from the service provider, at which point the server checks the user's session object. If the session object includes authorization to access the selected service, and further if all the conditions of authorization are satisfied, the server begins the requested service; otherwise, the server consults a directory service to determine whether the user has authorization to access the selected service. If the user has authorization to access the selected service, information regarding authorization to access the selected service and any related conditions of authorization are incorporated into the session object; otherwise, the user is denied access to the selected service.

Authorization to access a service may be conditional upon satisfaction of conditions of authorization. For example, the user's authorization to access the selected service may be limited to certain hours of the day. To manage authorization that is conditional, a listener object within the session object or otherwise associated with the session object is created. One purpose of the listener object is to terminate the user's access to the selected service when the conditions of authorization are no longer satisfied.

The listener object registers with a broadcast object that is managed by the server, and receives, from the broadcast object, information germane to conditions of authorization. From time to time, the broadcast object broadcasts information concerning conditions of authorization, for example notifications of changes in conditions pertinent to determining whether conditions of authorization are satisfied. The listener object receives the information from the broadcast object, and analyzes the information in accord with the conditions of authorization applicable to the particular user. When the conditions of authorization are satisfied, the server continues to provide the selected service, whereas if the particular conditions of authorization are no longer satisfied, the server denies or terminates access to the selected service.

As an illustration, an exemplary user might have authorization to access a chat-room service only between 7:00 PM and 8:00 PM. On one occasion, the user might log onto the web site that offers the chat room service at 7:10 PM, and specify the chat room service as the selected service. The listener object would determine that the user had authorization to access the chat room at 7:10 PM, and instruct or permit the server to provide the chat room service. During the course of the user's session, the listener object might receive information from the broadcast object reporting time-of-day at 7:15 PM, 7:30 PM, 7:45 PM, and 8:00 PM. The listener object would analyze each time-of-day report received from the broadcast object, and, in response to the 7:15, 7:30, and 7:45 reports, permit the user to continue participating in the chat room. Upon receiving the 8:00 PM report, however, the listener object would notify the server to terminate the user's access to the chat room, as the user's conditions of authorization to access the chat room would no longer be satisfied.

Thus, the present invention provides an efficient way to dynamically manage authorization to access Internet services by enabling the termination of earlier-authorized access when conditions change, as well as by granting and denying access. These and other aspects of the invention will be more fully appreciated when considered in the light of the following detailed description and drawings.

DETAILED DESCRIPTION

Figure 1:
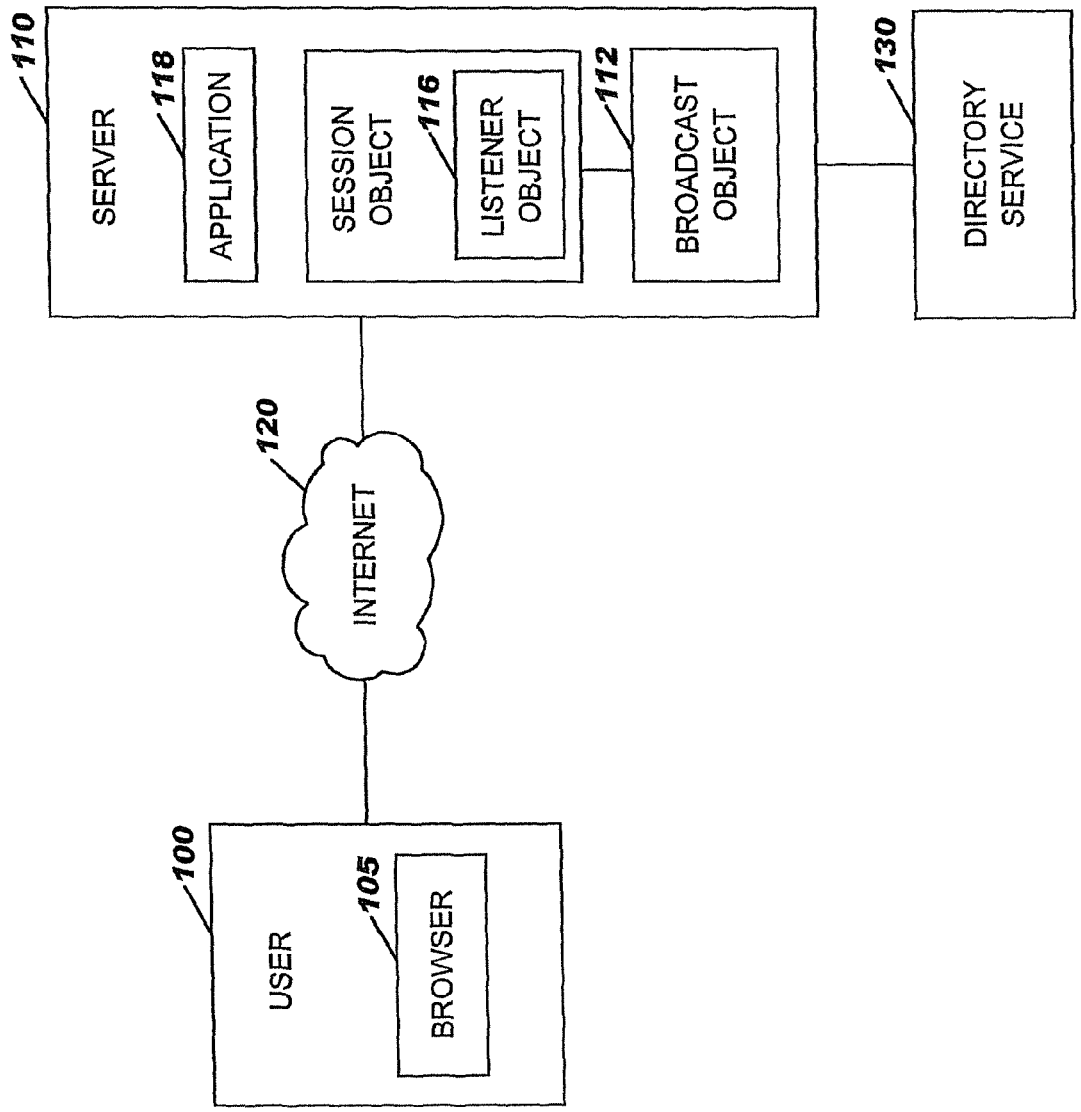
FIG. 1 is a block diagram that shows structural aspects of an exemplary embodiment of the present invention.

FIG. 1 shows structural aspects of an exemplary embodiment of the present invention. In FIG. 1, a user 100 establishes a session with a service provider's server 110, where the session involves communication over the Internet 120 or other communication network. The user 100 may include a web browser 105. The server 110 may connect directly or through the Internet 120 to a directory service 130 that supplies conditions of authorization that must be satisfied in order for the user 100 to have authorization to access a service provided by the server 110. The server 110 and the directory service 130 may communicate using Lightweight Directory Access Protocol (LDAP), or the like.

As shown in FIG. 1, the server 110 includes a broadcast object 112, a session object 114, a listener object 116, and an application program 118. The application program 118 provides a service selected by the user 100; the functions of the broadcast object 112, the session object 114, and the listener object 116 are described below. Although FIG. 1 shows the listener object 116 as internal to the session object 114, this is not a necessary condition of the invention, as the listener object 116 may be otherwise associated with the session object 114.

Figure 2A:
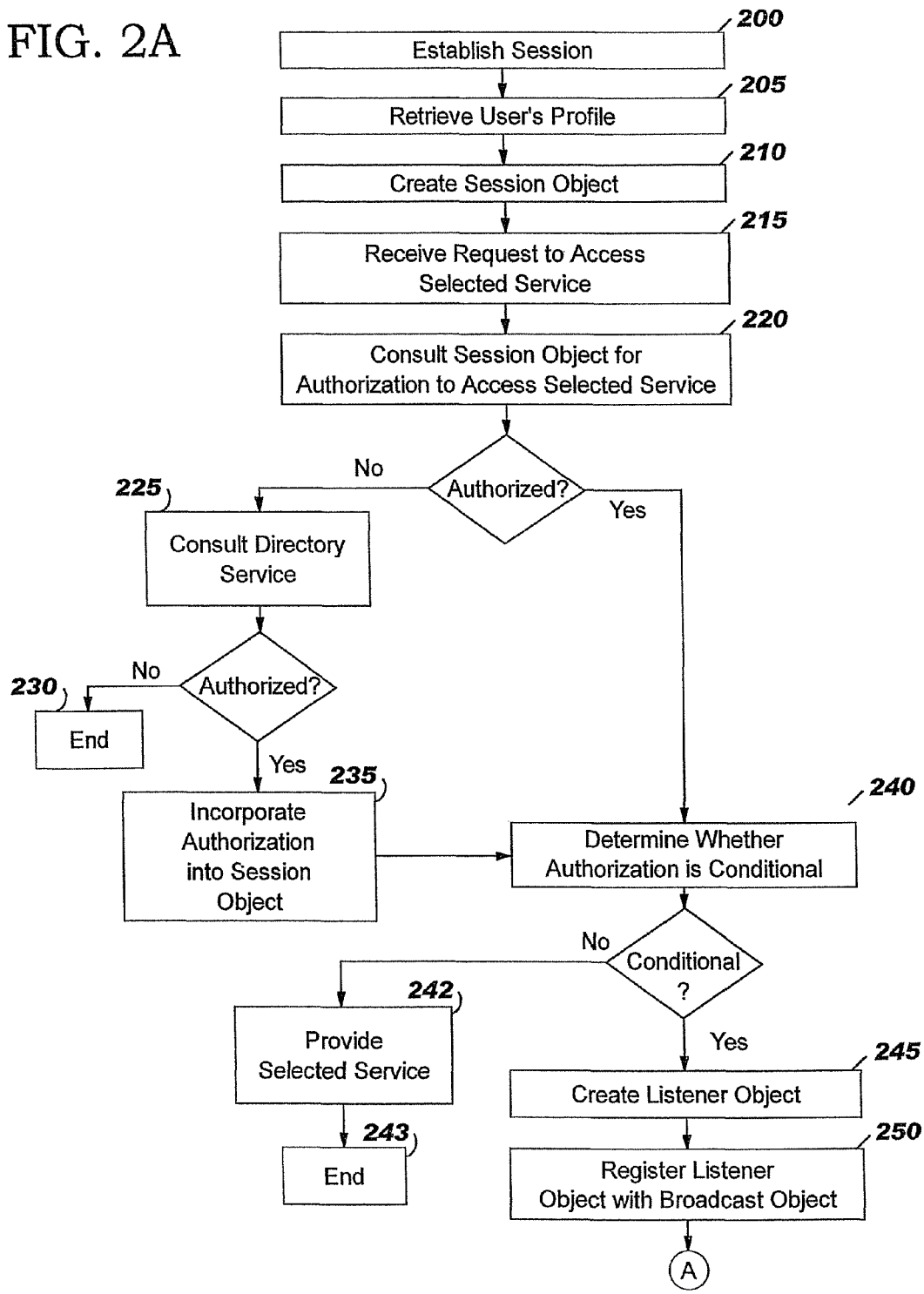
FIGS. 2A and 2B show a flowchart that depicts aspects of the operation of an exemplary embodiment of the present the invention.
Figure 2B:
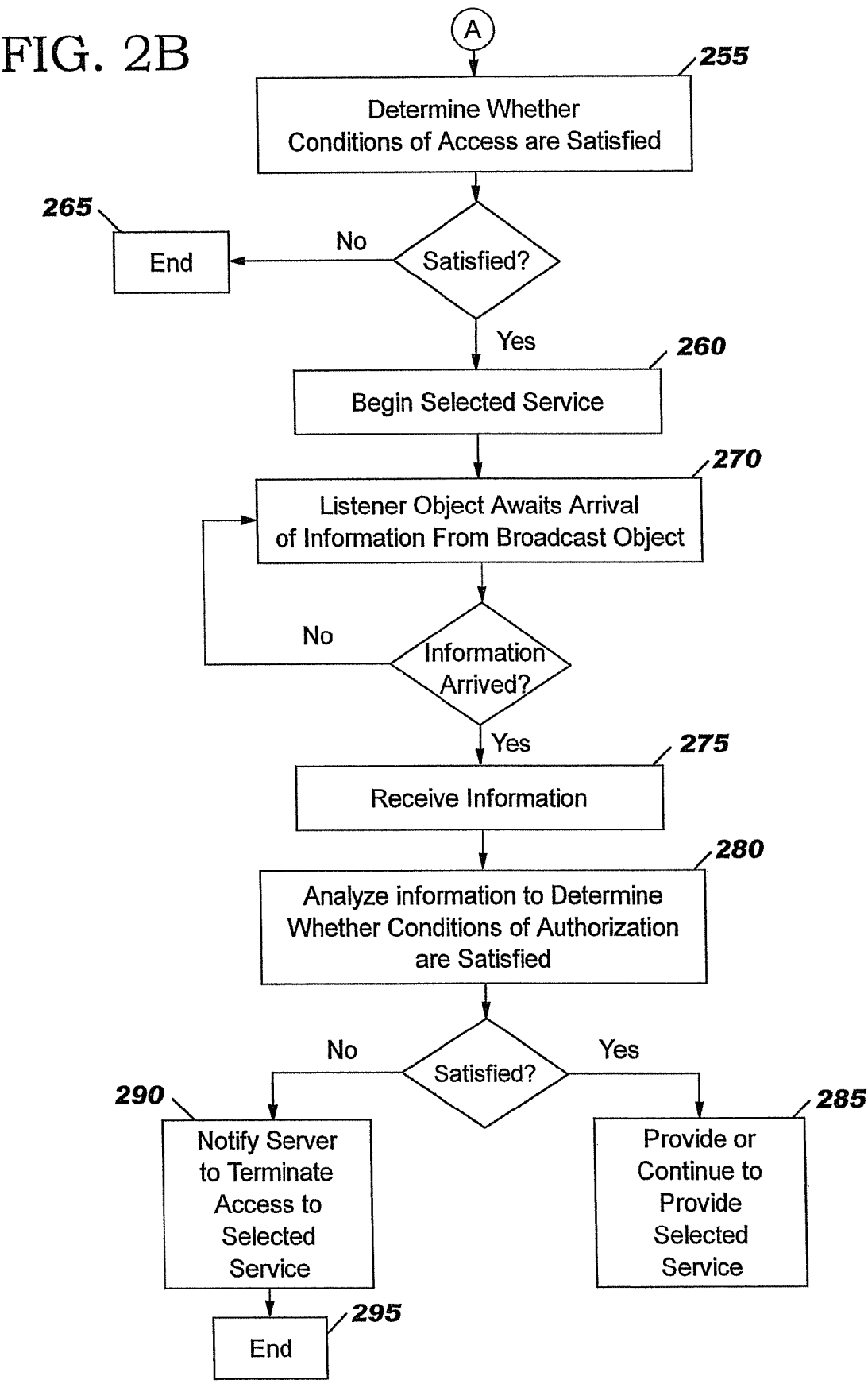

As shown in FIGS. 2A and 2B, the user 100 establishes a session with the server 110 (step 200). The server 110 then retrieves a profile for the user 100 from the directory service 130 (step 205). Using information included in the profile, the server 110 creates the session object 114, which identifies N services selected in the past by the user 100, where N is a positive integer (step 210). These may be the N services selected most recently by the user 100, or the N services selected most frequently by the user 100 over a predetermined historical period.

One purpose of the session object 114 is to identify the user 100 and its characteristics and privileges to the server 110 and to the application program 118 that is executed by the server 110 to provide the service selected by the user 100. Consequently, the session object 114 may contain authorization-to-access information, including conditions of authorization, that describe privileges of the user 100 to access (or not) the N services provided by the server 110.

Once a session is established, the user 100 selects a service to be provided by the server 110, and the server 110 receives a request from the user 100 to access the selected service (step 215). The server 110 then consults the session object 114 to determine whether the session object 114 includes authorization to access the selected service (step 220). If the session object 114 does not include authorization to access the selected service, the server 110 consults the directory service 130 to determine if the user 100 has authorization to access the selected service (step 225). If the user 100 is found not to have authorization to access the selected service, access may be denied gracefully, and the process ends (step 230). If the user 100 is found to have authorization to access the selected service, information regarding the authorization to access, including any condition of authorization, is incorporated into the session object 114 (step 235).

Otherwise (i.e., the session object 114 includes authorization to access the selected service, either a priori or after the step of incorporation (i.e., after step 235)), the server 110 determines whether authorization to access the selected service is conditional, i.e., whether authorization to access the selected service is dependent upon dynamic conditions (step 240). For example, a condition of authorization might specify that the user 100 has authorization to access the selected service during certain hours of the day, or on certain days of the week, or when the server 110 is lightly loaded, or when a number of points have accrued in an award account such as a frequent-flyer miles account, when a debit account has not been exhausted, and so forth. If authorization to access the selected service is determined not to be conditional, the selected service is provided (step 242), and continued until the user 100 ends the session (step 243).

Otherwise (i.e., authorization to access the selected service is determined to be conditional), a listener object 116 within the session object 114 or otherwise associated with the session object 114 is created (step 245). The listener object 116 registers with the appropriate broadcast object 112 (step 250), and determines whether the conditions of authorization are satisfied (step 255). If the conditions of authorization are not satisfied, access is denied, and the process ends (step 265). Otherwise (i.e., the conditions of authorization are satisfied) the selected service is begun (step 260).

The broadcast object 112 monitors selected conditions pertinent to determining the satisfaction of conditions of authorization required of the user 100 (hence, the broadcast object 112 was called above the "appropriate" broadcast object 112), and sends information such as notifications of changes in the selected conditions to its registered listeners. For example, a particular user's condition of authorization might be "authorization to access granted only between 7:00 PM and 8:00 PM," in which case the appropriate broadcast object 112 might include a clock that broadcasts time-of-day information every fifteen minutes.

The broadcast object 112 may send information in an event-driven manner according to changes in the selected conditions, or periodically, or aperiodically according to a predetermined schedule. Periodic and aperiodic broadcasts may also be thought of as being event-driven, in which case the passing of predetermined intervals of time would be considered to be events.

The listener object 116 awaits arrival of information from the broadcast object 112 (step 270). Until such information arrives, the listener object 116 continues to wait (step 270). When information from the broadcast object 112 arrives, the listener object 116 receives the information (step 275), and the listener object 116 analyzes the information in accord with the conditions of authorization applicable to the user 100, i.e., the listener object 116 analyzes the information in accord with the conditions of authorization in the session object 114 (step 280).

If the conditions of authorization continue to be satisfied, the server 110 continues to provide the selected service (step 285), and the listener object 116 remains quiet while returning to await the arrival of further information from the broadcast object 112 (step 270). Otherwise (i.e., the conditions of authorization are not satisfied), the listener object 116 initiates an action. For example, the listener object 116 may notify the server 110 to terminate access to the selected service (step 290), after which the process ends (step 295).

From the foregoing description, those skilled in the art will recognize that the present invention provides an efficient way of managing dynamic, conditional authorization to access an Internet service provided by an Application Service Provider or an Internet Service Provider. The foregoing description is illustrative rather than limiting, however, and the present invention is limited only by the following claims.

We claim:

1. Programmable storage media containing programmable software for managing authorization to access a service by a remote user who has established a session with a server, said programmable software comprising the steps of:

retrieving, by the server, a profile of the user from a directory service that is directly connected to the server;

after said retrieving the profile of the user, creating a session object that identifies N services selected by the user in the past, wherein said creating is performed by the server using information included in the retrieved profile of the user, wherein the session object is configured to identify the user, characteristics of the user, and privileges of the user to the server and to an application program, wherein N is a positive integer, and wherein the server comprises the session object;

receiving, by the server from the user via a communication network after said creating the session object, a request for the service to be provided to the user by execution of the application program by the server, wherein the server comprises the application program;

after said receiving the request, ascertaining by the server that the session object does not include a condition of authorization for the user to have access to the requested service;

responsive to said ascertaining that the session object does not include the condition of authorization, determining by the server from consultation with the directory service that the user has authorization for accessing the requested service;

responsive to said determining that the user has authorization for accessing the requested service, receiving the condition of authorization from the directory service followed by incorporating the received condition of authorization into the session object;

after said incorporating the condition of authorization into the session object, determining by the server that the authorization for the user to access the service is conditional with respect to satisfaction of dynamic temporal conditions;

responsive to said determining by the server that the authorization for the user to access the service is conditional with respect to satisfaction of dynamic temporal conditions, creating a listener object within the session object;

after said creating the listener object, registering the listener object with a broadcast object, wherein the server comprises the broadcast object, and wherein said registering is performed by the listener object;

receiving, by the listener object after said registering the listener object, information sent by the broadcast object;

determining, by the listener object from the information received from the broadcast object, that the condition of authorization is satisfied, followed by initiating execution of the application program by the server to provide the service to the user;

after said initiating execution of the application program, receiving, by the listener object from the broadcast object, condition information relating to the condition of authorization;

analyzing, by the listener object, the received condition information to determine whether the condition of authorization is satisfied; and if said analyzing determines that the condition of authorization is satisfied then continuing said execution of the application program, otherwise ending said execution of the application program.

2. The programmable storage media claim 1, wherein the N services are the N services most recently selected by the user.

3. The programmable storage media claim 1, wherein the N services are the N services selected most frequently by the user in a predetermined historical period.

* * * * *